(12) United States Patent
Bondalapati et al.

(10) Patent No.: US 10,482,035 B1
(45) Date of Patent: Nov. 19, 2019

(54) STANDARD ADDRESS KEY SYSTEM AND METHOD

(71) Applicant: JPMorgan Chase Bank, N.A., New York, NY (US)

(72) Inventors: Swapna Bondalapati, New York, NY (US); Richard Lusk, New York, NY (US); Steven Simecek, New York, NY (US); Rachel Dean, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 214 days.

(21) Appl. No.: 15/614,806

(22) Filed: Jun. 6, 2017

Related U.S. Application Data

(60) Provisional application No. 62/346,737, filed on Jun. 7, 2016.

(51) Int. Cl.
*G06F 12/14* (2006.01)
*G06F 21/78* (2013.01)
*G06F 21/60* (2013.01)

(52) U.S. Cl.
CPC ........ *G06F 12/1408* (2013.01); *G06F 21/602* (2013.01); *G06F 21/78* (2013.01); *G06F 12/14* (2013.01)

(58) Field of Classification Search
CPC .... G06F 12/1408; G06F 21/78; G06F 21/602; G06F 12/14
See application file for complete search history.

(56) References Cited

U.S. PATENT DOCUMENTS

| | | | | |
|---|---|---|---|---|
| 3,676,856 | A * | 7/1972 | Manly | B41J 3/50 715/209 |
| 5,907,608 | A * | 5/1999 | Shaffer | H04M 3/42 379/207.12 |
| 6,385,312 | B1 * | 5/2002 | Shaffer | H04M 3/42 379/211.02 |
| 7,747,480 | B1 * | 6/2010 | Agresta | G06Q 10/087 705/28 |
| 2002/0040359 | A1 * | 4/2002 | Green | G06F 17/2785 |
| 2004/0083233 | A1 * | 4/2004 | Willoughby | G06Q 10/08 |
| 2004/0220918 | A1 * | 11/2004 | Scriffignano | G06F 16/2468 |
| 2004/0225543 | A1 * | 11/2004 | Kapochunas | G06Q 10/06375 705/7.37 |
| 2005/0086256 | A1 * | 4/2005 | Owens | G06F 16/284 |
| 2006/0047571 | A1 * | 3/2006 | Garcia | G06Q 30/02 705/14.64 |
| 2006/0064249 | A1 * | 3/2006 | Clark | A61K 9/0019 702/19 |

(Continued)

*Primary Examiner* — J. Brant Murphy
(74) *Attorney, Agent, or Firm* — Greenblum & Bernstein, P.L.C.

(57) ABSTRACT

A technique is provided for standardizing addresses. The technique includes implementing a standardization algorithm utilizing at least one computer processor to arrive at a standard address key for each address. The standardization algorithm performs multiple steps. The standardization algorithm pre-processes each input. The algorithm further performs cleaning and preparing each address by removing unnecessary portions of each address and parsing the address by searching the components of the address. The algorithm also concatenates all parts of each parsed address into a standard address key.

20 Claims, 8 Drawing Sheets

(56) References Cited

U.S. PATENT DOCUMENTS

| | | | |
|---|---|---|---|
| 2006/0100912 A1* | 5/2006 | Kumar | G06Q 40/08 |
| | | | 705/4 |
| 2006/0262910 A1* | 11/2006 | Molnar | G06K 9/00469 |
| | | | 379/88.17 |
| 2008/0027980 A1* | 1/2008 | Owens | G06F 16/284 |
| 2008/0065605 A1* | 3/2008 | Bourland | G06F 16/248 |
| 2010/0306287 A1* | 12/2010 | Raphaeil | G09B 29/106 |
| | | | 707/919 |
| 2011/0035414 A1* | 2/2011 | Barton | G06Q 30/02 |
| | | | 707/802 |
| 2011/0270808 A1* | 11/2011 | Faruquie | G06F 17/2735 |
| | | | 707/692 |
| 2013/0097157 A1* | 4/2013 | Ng | G06F 16/248 |
| | | | 707/723 |
| 2015/0120519 A1* | 4/2015 | Collins | G06Q 40/10 |
| | | | 705/30 |
| 2017/0220975 A1* | 8/2017 | Oba | G06Q 10/083 |

\* cited by examiner

FIG 6A (600)

Incorrect 610

| | sk_match_add |
|---|---|
| 1 | 06418COMODOR25------ |
| 2 | 06418COMODOR25------ |

620

| | stnd_addr_key |
|---|---|
| | 06418 25*COMMODOREHULLSD |
| | 06418 25*COMMODORECMNS |

602

| addr_line_1_tx | addr_line_2_tx | city_tx | state_cd | zip_cd |
|---|---|---|---|---|
| 25 COMMODORE HULL DR | | DERBY | CT | 06418 |
| 25 COMMODORE CMNS | | DERBY | CT | 06418 |

Incorrect 640

| | sk_match_add |
|---|---|
| 1 | 92501WLACADEN905---#2 |
| 2 | 92501WLACADEN905------ |

650

| | stnd_addr_key |
|---|---|
| | 92501 905*@2WLACADENASD |
| | 92501 905*@2WLACADENASD |

622

| addr_line_1_tx | addr_line_2_tx | city_tx | state_cd | zip_cd |
|---|---|---|---|---|
| 905 W LA CADENA DR | APT 2 | RIVERSIDE | CA | 92501 |
| 905 W LA CADENA DR | SPC 2 | RIVERSIDE | CA | 92501 |

624

Old vs New: House Number Identification

Old Code: 10 Steps

```
if substr(XADDRESS,1,1) in ('0' '1' '2' '3' '4' '5' '6' '7' '8' '9') then do ;
   if substr(XADDRESS,2,1) = ' ' then do ;
      strt = substr(XADDRESS,2) ;mtch3 = substr(XADDRESS,1,1) ;
   end ;
   else if substr(XADDRESS,3,1) = ' ' then do ;
      strt = substr(XADDRESS,3) ;mtch3 = substr(XADDRESS,1,2) ;
   end ;
   else if substr(XADDRESS,4,1) = ' ' then do ;
      strt = substr(XADDRESS,4) ;mtch3 = substr(XADDRESS,1,3) ;
   end ;
   else if substr(XADDRESS,5,1) = ' ' then do ;
      strt = substr(XADDRESS,5) ;mtch3 = substr(XADDRESS,1,4) ;
   end ;
   else if substr(XADDRESS,6,1) = ' ' then do ;
      strt = substr(XADDRESS,6) ;mtch3 = substr(XADDRESS,1,5) ;
   end ;
   else if substr(XADDRESS,7,1) = ' ' then do ;
      strt = substr(XADDRESS,7) ;mtch3 = substr(XADDRESS,1,6) ;
   end ;
   else if substr(XADDRESS,8,1) = ' ' then do ;
      strt = substr(XADDRESS,8) ;mtch3 = substr(XADDRESS,1,7) ;
   end ;
   else if substr(XADDRESS,9,1) = ' ' ; mtch3 = substr(XADDRESS,1,8) ;
      strt = substr(XADDRESS,9) ;
   end ;
   else strt = substr(XADDRESS,1) ;
end ;
```

710

New Code: 1 Step

```
house_nb=strip(substr(substr(address,anydigit(address),notdigit(substr(address,anydigit(address))||'a')-1)) ;
```

STANDARD ADDRESS KEY SYSTEM AND METHOD

RELATED APPLICATIONS

This application claims priority to U.S. Provisional Application No. 62/346,737, filed on Jun. 7, 2016.

TECHNICAL FIELD

Embodiments of the invention are related generally to systems and methods for address standardization through implementation of a standard address key.

BACKGROUND OF THE INVENTION

Address standardization involves rewriting addresses in a standard format. This standardization is helpful both in ensuring address accuracy and in deleting duplicate addresses from one or more databases. Currently existing systems for developing standard addresses are deficient in multiple respects and often will erroneously translate two addresses which are actually the same address, written slightly differently, into entirely different addresses. Alternatively, existing systems may erroneously translate two addresses, which are actually different, into the same address, thus losing the distinctions between the two addresses. Undesirable consequences of using inaccurate and duplicate addresses include unnecessary mailing costs, excess returned mail, loss of target customers, and customer annoyance.

For example, currently existing systems often fail to adequately differentiate between designations such as "Street", "Road", "Place", "Drive", "Avenue", "Boulevard", "Court", "Circle", etc. Often localities may have identical addresses with the exception of these designations. Thus, standardization may erroneously cause "360 Jones Ford Road" to be standardized to the same address as "360 Jones Ford Place".

Additionally, currently existing system often fail to differentiate adequately between directions, e.g. "East", "West", "NW", "SE", etc. Thus, two addresses located in different quadrants of a city may be erroneously standardized to the same address.

Furthermore, existing systems have difficulty accurately identifying numbered streets as the same street when the numbers are expressed differently. For example, existing systems may incorrectly characterize "First St." as a different location than "1st St.".

Existing systems additionally have difficulties with processing of long addresses. The existing systems may cut off portions of the address and the portions deleted may be critical to identifying and standardizing the address.

A further deficiency of existing systems involves inefficient coding that slows down computer processing and consumes excessive computing resources. For example, rather than compact code, existing systems often utilize a series of "If" "then" "Else" statements rather than more streamlined approaches.

Accordingly, a more efficient system of address standardization is desired that efficiently processes addresses for standardization and overcomes the deficiencies inherent in pre-existing systems. A system is needed that processes addresses written in multiple different ways to reach a conclusion that identifies that the addresses actually refer to the same place.

SUMMARY OF THE INVENTION

In one aspect, the invention includes a method for creating a standard address key. The method includes storing rules for standardization in a computer memory, receiving addresses at an input interface from multiple data sources, each address including multiple components, and implementing a standardization algorithm utilizing at least one computer processor to arrive at a standard address key for each address. The standardization algorithm pre-processes each input and cleans and prepares each address by removing unnecessary portions of each address. The standardization algorithm further performs parsing of each address by searching the components of the address. Finally, the standardization algorithm concatenates all parts of each parsed address into a standard address key.

In an additional aspect, the invention includes a computer-implemented system for address standardization. The system includes at least one computer memory storing rules for standardization and at least one input interface for receiving addresses from multiple data sources, each address including multiple components. The system further includes at least one computer processor implementing a standardization algorithm to arrive at a standard address key for each address. The standardization algorithm performs multiple steps. The standardization algorithm pre-processes each input address and cleans and prepares each address by removing unnecessary portions of each address. The standardization algorithm further parses the address by searching the components of the address, and subsequently concatenates all parts of each parsed address into a standard address key.

In further aspects of the invention the standardization method and system utilize an SAS® macro program capable of reading in data from spreadsheets and databases.

BRIEF DESCRIPTION OF THE DRAWINGS

Embodiments of the present invention are described in detail below with reference to the attached drawings figures, wherein:

FIGS. 6A and 6B are charts illustrating a comparison between results obtained by the standard address key system and results obtained by a prior art system;

FIG. 7 is a table showing a comparison between pre-existing code and sample code in accordance with an embodiment of the invention.

DETAILED DESCRIPTION OF PREFERRED EMBODIMENTS

Embodiments of the present invention are directed to a system and method for address standardization that utilizes advanced string scanning, parsing, and data step logic to improve processing efficiency over previously existing systems. Thus, the system described herein is efficient both with respect to processing time and computing resources. In exemplary embodiments, the disclosed algorithm may be implemented using SAS® software and can be used wherever SAS® is available, for example, from local servers, which may include desktop computers, mainframe computers, laptops, tablets, etc. The process can be used to identify addresses and the identification can be exported from SAS® if required.

Figure 1:
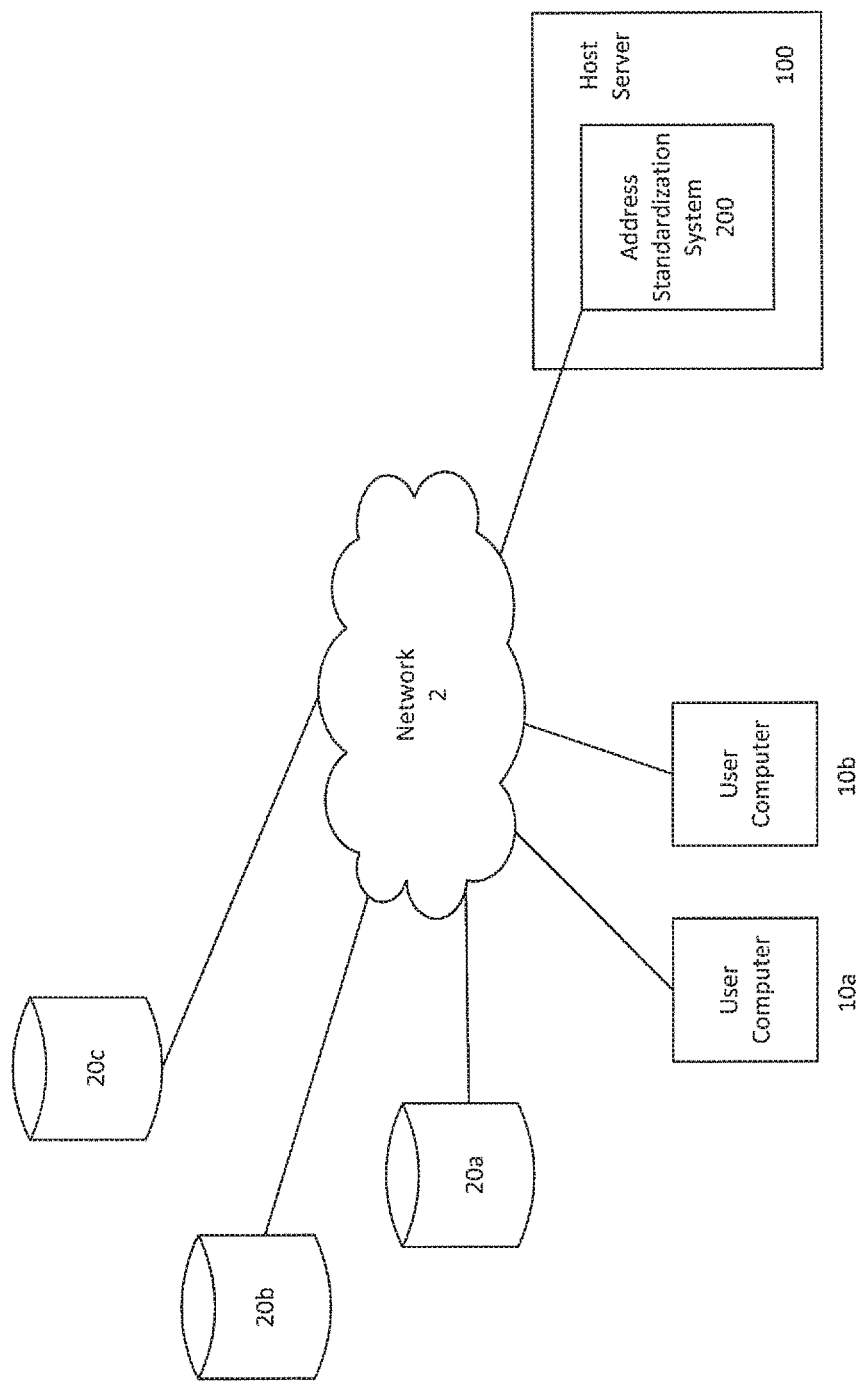
FIG. 1 is a block diagram illustrating an operating environment for a standard address key system in accordance with an embodiment of the invention.

FIG. 1 is a block diagram illustrating an operating environment for a standard address key system in accordance with an embodiment of the invention. Multiple user computing systems 10a, 10b, and 10c may be connected over a network 2 with a host server 100 hosting an address standardization system 200. Multiple data sources 20a, 20b, and 20c may also be connected over the network 2 with the host server 100 and address standardization system 200.

The network 2 may include a wired or wireless local area network (LAN) and a wide area network (WAN), wireless personal area network (PAN) and other types of networks. Although only one network is shown, the computers may be connected over multiple disparate networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The user computers 10a, 10b may include computing systems adapted for use by persons utilizing the standardization system. These persons may be, for example, administrators or other personnel seeking information from the standardization system. For example, administrators may be seeking identification of duplicate addresses and may utilize the standardization system to identify these duplicate addresses. User computers 10 may include at least one processor and one or more applications executed on the processor capable of communicating with a host system through submission of instructions. The user computers 10 may include a browser for accessing applications provided by the host system or other connected systems that offer such functionality over the Internet or any other network. The user computers 10 may additionally be or include mobile systems, such as smart phones, tablets, or other portable computing apparatus. User computers 10 may execute downloadable applications for operating in conjunction with the host system 100. The downloadable applications may be stored in memory and executed by processors on the mobile systems and may provide a plurality of user interfaces.

The data sources 20a, 20b, and 20c may include additional or fewer data sources accessible to the host server 100. The stored data may be structured, semi-structured, or unstructured. The data storage areas may include file systems and databases for storing large amounts of data. For example, the data storage areas may include HP 3PAR StoreSery® Storage systems. Those of ordinary skill in the art will appreciate that other computer storage systems for storing large amounts of data may be implemented. Data stored in the data storage areas may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data.

As illustrated, the address standardization system 200 may be included in a host system or platform 100. The host system 100 may be a mainframe computer or alternatively a desktop, laptop, tablet, or other mobile computing device.

The address standardization system 200 is able to import, process, and utilize information from the data sources 20a, 20b, 20c and or any information contained within the host system 100. The address standardization system 200 may receive lists of addresses at an input interface from the data sources 20a, 20b, and 20c. The lists of addresses may include, for example, lists of addresses produced by particular businesses intended for targeted marketing to customers, lists of billing addresses, lists of invitees to events, etc. The address standardization system may also receive or access a non-solicitation list containing addresses to which targeting marketing materials should not be directed. The host system 100 or the address standardization system 200 may provide a website for users and through this website, the users may leverage the address standardization system 200 disclosed herein. The users may utilize a browser to access a URL directed to the website. The address standardization system preferably operates using SAS® programming language and can read in data from common spreadsheets and databases. The SAS® language can run under compilers usable on Windows®, Linux, and UNIX operating systems.

Figure 2:
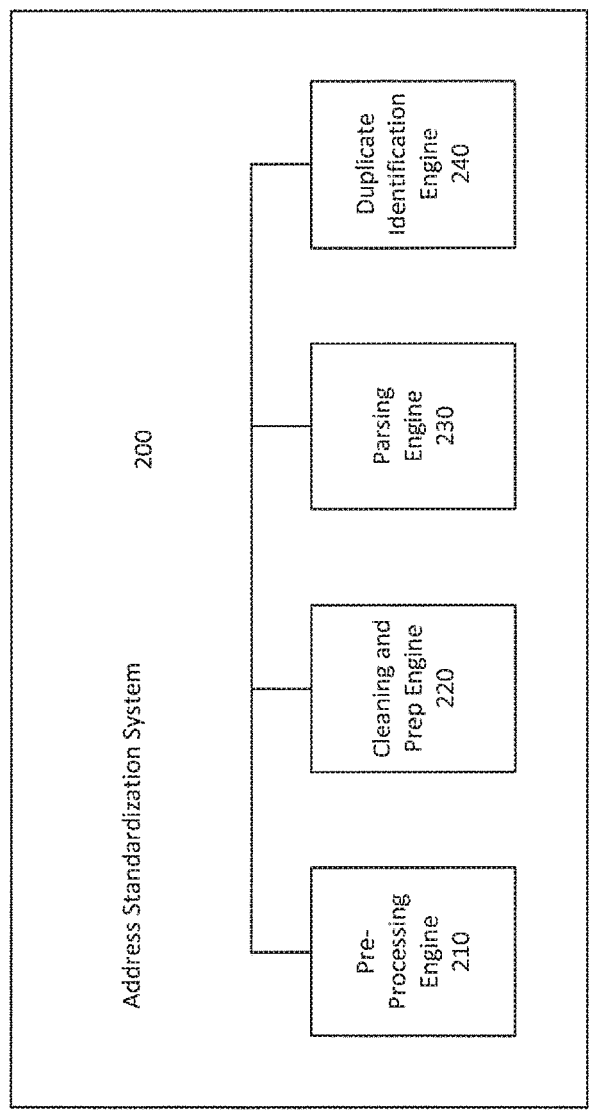
FIG. 2 is a block diagram illustrating components of the standard address key system in accordance with embodiments of the invention.

The standard key address system 200 is further illustrated in FIG. 2.

Various components shown including a pre-processing engine 210, a cleaning and prep engine 220, a parsing engine 230, and a duplicate identification engine 240 may be included in the system. The standard key address system 200 may include additional components such as input and output interfaces, memory, processors, displays, and other computing components.

The pre-processing engine 210 operates to verify the existence of input data sets, determine that an output data set is specified and that address and zip code variables exist. The pre-processing engine 210 operates upon receipt of data through the input interface.

The cleaning and prep engine 220 cleans and prepares the input address for parsing. The cleaning and prep engine 220 may remove uncommon or incorrect characters, such as for example *, %, or !. The cleaning and prep engine 220 may further eliminate unnecessary parts of the address. For example, when a zip code is known, the city and state become unnecessary components of the address.

The parsing engine 230 parses the cleaned and prepped address by searching on its various components, such as the PO Box, abbreviated words, street type, and apartment identifier. The parsing engine 230 may simplify addresses by using standardized abbreviations. For example, apartment numbers may designated by "@", PO Boxes may be designated by "A", street type may be designated by "$", half address may be designated by "&", and the absence of a house number may be designated by "*". Thus, apartment 201 would be simplified to @201 and PO Box 2665 would be written as A2665. Additionally, the parsing engine 230 may resolve abbreviations. For example, "Crossing" may be written as "Xing", "Point" may be written as "Pt", and "Heights" may be written as "Hts". Numerical abbreviations may also be resolved. For example, "First" may be written as "1$^{st}$". The parsing engine 230 iterates to a next step after identifying these components. Thus, the parsing engine 230 further identifies the house number and apartment number and concatenates all parts into a final address using a minimum number of necessary characters. The parsing engine may utilize advanced string scanning and parsing logic in order to identify the house number and apartment number.

The duplicate identification engine 240 may operate to identify duplicate addresses based on the standardization performed by the parsing engine. In embodiments of the invention, the duplicate identification engine 240 operates to identify duplicate addresses within a single address list and may eliminate the duplicates in order to consolidate the list and prevent excessive targeted mailings to a single address. The lists may include targeted mailing lists containing addresses representing marketing or billing targets. The lists may further include non-solicitation lists or other lists of addresses that should not be utilized for targeted mailings. These lists may individually be processed through the standard key address system so that all of the addresses on the lists are standardized and that duplicate addresses can be eliminated.

In additional embodiments of the invention, the duplicate identification engine 240 may operate to identify duplicates between multiple lists. For example, the duplicate identification engine 240 may operate to identify duplicates between the targeted mailing list and the non-solicitation list, which contains addresses to which marketing correspondence cannot be mailed. The duplicate identification engine 240 can be configured to suppress addresses on the targeted mailing list which also appear on the non-solicitation list. In this manner, the system prevents mailings to unauthorized addresses. Other lists that may be run through the duplicate identification engine 240 may include lists of organizations or branches associated with the host server that do should not receive the mailings. The address standardization system may operate on the lists individually prior to comparison or may operate on the received lists simultaneously.

Figure 3:
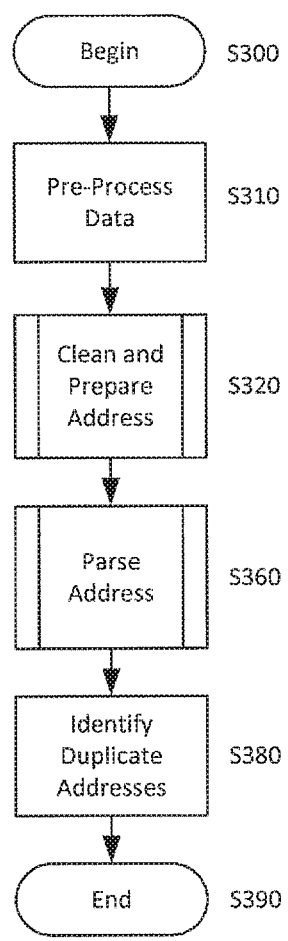
FIG. 3 is a flow chart illustrating a standard address key algorithm in accordance with an embodiment of the invention.

FIG. 3 is a flow chart illustrating standard address key algorithm processing in accordance with an embodiment of the invention. The method begins in S300 and the system receives address data and pre-processes the data at S310. Pre-processing may involve verifying existence of an input data set, determining a required output data set, and verifying that address and zip code variables exist. In S320, the system cleans and prepares the address. In S360 the system parses the address and arrives at a standard address key. In S380, the system compares standardized addresses in order to identify duplicates. The process ends in S390. The substeps of the above-referenced steps or processes are described below with reference to FIGS. 4 and 5.

Figure 4:
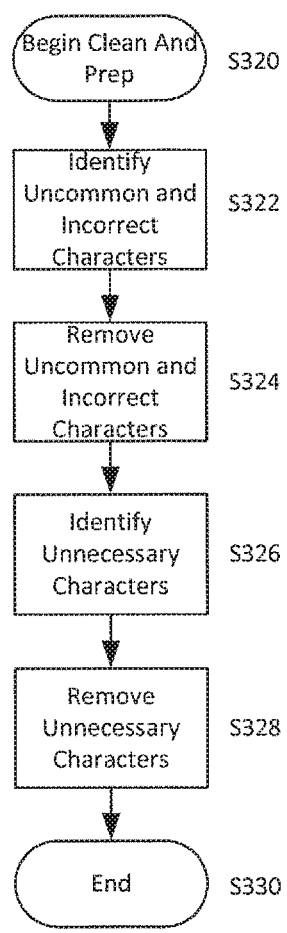
FIG. 4 is a flow chart illustrating aspects of the standard address key algorithm in accordance with an embodiment of the invention.

FIG. 4 is a flow chart illustrating aspects of the standard address key algorithm including the cleaning and preparation in S320 in accordance with an embodiment of the invention. The system identifies incorrect and uncommon characters in S322. These incorrect or uncommon characters may include various types of punctuation or symbols, such "!", "*", or "%" or other symbols not used in referencing addresses. In S324, the system removes the identified uncommon or incorrect characters from the address. In S326, the system may identify unnecessary portions of the address. For example, when a zip code is known, the city and state become unnecessary, since the zip code adequately defines the particular location. In S328, the system removes the identified unnecessary characters. The process ends in S330.

Figure 5:
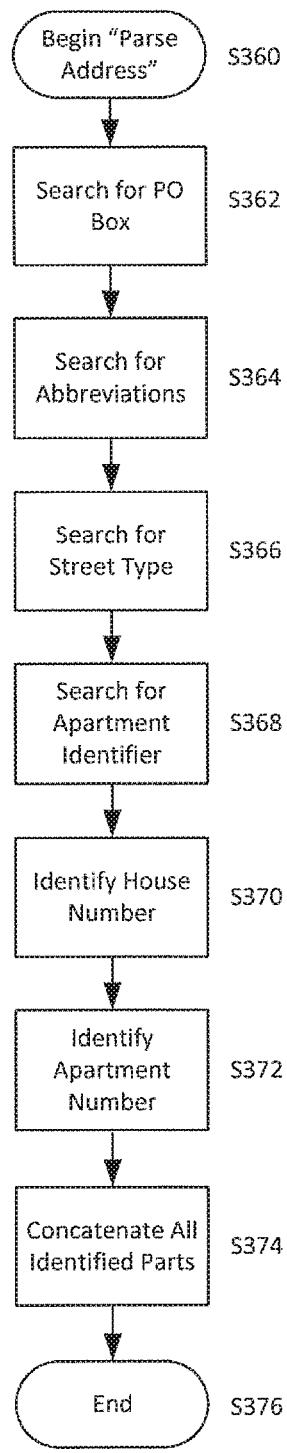
FIG. 5 is a flow chart illustrating further aspects of the standard address key algorithm in accordance with embodiments of the invention.

FIG. 5 is a flow chart illustrating further aspects of the standard address key algorithm including address parsing S360 in accordance with embodiments of the invention. In S362, the system searches for a PO Box, In S364, the system searches for abbreviated words. For example, Canyon may be abbreviated as "CYN:; Crossing may be abbreviated as "XING", and Heights may be abbreviated as "HTS". In the final address key, the system may utilize an appropriate standardized abbreviation. In S366, the system searches for a street type. The street type may include, for example, "street", "road, "place", "avenue", "circle", "drive", "lane", etc. The parsing in S366 may standardize these types. For example, "street" may be identified as "$S". "Avenue" may be represented as "$A", "Drive" may be represented as "$D", etc. In S368, the system searches for an apartment identifier. For example, if the words "apartment", "apt", "unit", or "suite" are identified, the system may identify these terms as apartment identifiers and replace them with a character such as '@'. The system iterates to S370 and S372 after identifying the street type, apartment, and PO Box. In S370, the system may identify house numbers accompanying the street type. In S372, the system may identify an apartment number for concatenation with the apartment identifier. In S370 and S372, the system utilizes advanced string scanning and parsing logic. In S374, the system may concatenate the parsed information into a final address key. In preferred embodiments, the system utilizes the pipe "1" to delimit key components of the parsed address and uses the minimum number of necessary characters. In particular, the necessary numbers are delimited from the necessary characters. In each step of the parsing algorithm 360, the search may be followed by replacement of an identified component with a standardized expression.

Figure 8:
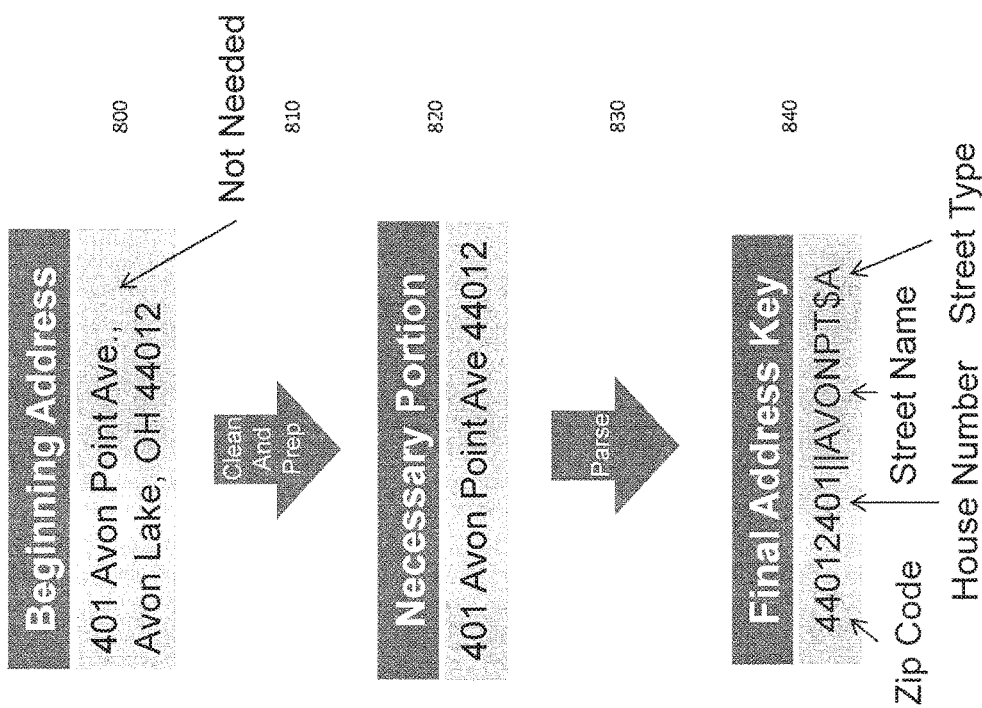
FIG. 8 is a flow diagram illustrating a standard key address method operating on a particular address in accordance with an embodiment of the invention.

FIG. 8 illustrates the processes described above in connection with a specific example. A beginning address 800 is written as "401 Avon Point Ave., Avon Lake, Ohio 44012". At 810, the system cleans and preps by removing the punctuation. It also determines that the city and state are unnecessary given the presence of the zip code. Thus, a necessary portion of the address is written at 820 as "401 Avon Point Ave 44012". At 830 the system parses the address to arrive at a Final address key 840. The final address key is 4401240111AVONPT$A. As illustrated, the final key represents the zip code followed by the house number. The necessary numbers are delimited from the necessary words with the pipe character. The necessary words and symbols include the Street name followed by the street type.

FIGS. 6A and 6B are charts illustrating a comparison between results obtained by the standard address key system and results obtained by a prior art system. As mentioned above, shortcomings of previously utilized processes include (1) failure to differentiate between "street", "road", "drive", etc; (2) differentiating between directions, e.g. "East", "West"; (3) identifying numbered streets, e.g. "First St." vs. ""1$^{st}$ St", "Second St." vs. "2$^{nd}$ St.", etc.; and (4) handling of long addresses, e.g. "2291 West Martin Luther King Boulevard Apt 101". In previous processes, apartment numbers were often excluded when the address was long. Accordingly, the standard address key system has been developed and tested using millions of addresses in footprint states to overcome these difficulties.

As shown in FIG. 6A, a previous process, referenced herein as "SK Match" failed to correctly distinguish between two different addresses. In this example, original addresses 602 are shown as 25 Commodore Hull Dr. and 25 Commodore Cmns with the city, state, and zip code shown at 604 as Derby Conn. 06418. At 610, the SK Match process incorrectly maps these two different addresses to a single address. However, as shown at 620, the standard address key process disclosed herein correctly identifies the addresses as distinct.

Also, as shown in FIG. 6B, the SK Match process incorrectly identified a single address written in two different ways as shown at 622 and 624 as two different addresses at 640. However, the standard address key process disclosed herein recognizes these two differently written addresses as the same address as shown at 650. In this instance, the apartment identifier was written in two different ways. With the presently disclosed approach, the system was able to identify both "APT" and "SPC" as apartment identifiers, thereby correctly identifying the two addresses as the same address.

FIG. 7 is a table showing a comparison between pre-existing code 710 and sample code 720 in accordance with an embodiment of the invention. As illustrated, the previous code 710 utilizes a series of if then, else statements for house number identification. However, the present approach is able to identify the house number by processing one line of code 720.

Accordingly, embodiments of the invention read and parse addresses to create a standardized key for address identification and utilize an SAS® macro program to identify addresses that are the same as well as those that are different. Thus, the system allows matching of address data from multiple data sources and identifies duplicate addresses to lead to more accurate lists and analyses and identify unmatched records from files.

The system as illustrated in the block diagrams and flowcharts of the above-described Figures includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention.

All of the components shown in the FIGs. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A computer-implemented method for creating a standard address key, the method comprising:
    storing rules for standardization in a memory;
    receiving addresses at an input interface from multiple data sources, each address including multiple components; and
    implementing a standardization algorithm utilizing at least one computer processor to arrive at a standard address key for each address, the standardization algorithm performing steps including:
    pre-processing each address,
    cleaning and preparing each address by removing unnecessary portions of each address,
    parsing each address by searching the components of each address, and
    concatenating all parts of each parsed address into a standard address key that includes a minimum number of necessary characters,
    wherein when an address includes a zip code and at least one of a city and a state, the removing unnecessary portions includes removing each of the at least one of the city and the state.

2. The method of claim 1, wherein the pre-processing includes removing incorrect characters and punctuation to identify a necessary portion.

3. The method of claim 2, wherein the parsing includes operating on the necessary portion to identify parts of each address.

4. The method of claim 3, further including replacing identified parts of each address with standardized expressions.

5. The method of claim 4, wherein concatenating the parts of each address include concatenating the standardized expressions.

6. The method of claim 1, wherein the standard address key includes necessary numbers delimited from necessary characters.

7. The method of claim 1, further comprising accepting address lists from databases.

8. The method of claim 7, wherein one of the address lists is a non-solicitation address list.

9. The method of claim 8, further comprising comparing, using a duplicate identification engine, standardized addresses on the non-solicitation list with standardized addresses on a mailing list to enable suppression of the addresses contained on the mailing list that are contained on the non-solicitation list.

10. A system for address standardization, the system comprising:
    at least one computer memory storing rules for standardization;
    at least one input interface for receiving addresses from multiple data sources, each address including multiple components; and
    at least one computer processor implementing a standardization algorithm to arrive at a standard address key for each address, the standardization algorithm performing steps including:
    pre-processing each address,
    cleaning and preparing each address by removing unnecessary portions of each address,
    parsing each address by searching the components of each address, and
    concatenating all parts of each parsed address into a standard address key that includes a minimum number of necessary characters,
    wherein when an address includes a zip code and at least one of a city and a state, the removing unnecessary portions includes removing each of the at least one of the city and the state.

11. The system of claim 10, wherein the pre-processing includes removing incorrect characters and punctuation to identify a necessary portion.

12. The system of claim 11, wherein the parsing includes operating on the necessary portion to identify parts of each address.

13. The system of claim 12, further including replacing identified parts of each address with standardized expressions.

14. The system of claim 13, wherein concatenating the parts of each address includes concatenating the standardized expressions.

15. The system of claim 10, wherein the standard address key includes necessary numbers delimited from necessary characters.

16. The system of claim 10, wherein the parsing, is performed by an SAS® macro program.

17. The system of claim 10, wherein the input interface accepts address lists from databases.

18. The system of claim 17, wherein one of the address lists is a non-solicitation address list.

19. The system of claim 18, further comprising a duplicate identification engine configured to compare standardized addresses on the non-solicitation list with standardized addresses on a mailing list to enable suppression of the addresses contained on the mailing list that are contained on the non-solicitation list.

20. A non-transitory computer readable medium for storing executable instructions, wherein the instructions, executed on a computing device perform the following steps:
    retrieving rules for standardization from a computer memory;
    receiving addresses at an input interface from multiple data sources, each address including multiple components; and
    implementing a standardization algorithm utilizing at least one computer processor to arrive at a standard address key for each address, the standardization algorithm performing steps including;
    pre-processing each address,
    cleaning and preparing each address by removing unnecessary portions of each address, parsing each address by searching the components of each address, and concatenating all parts of each parsed address into a standard address key that includes a minimum number of necessary characters, wherein when an address includes a zip code and at least one of a city and a state, the removing unnecessary portions includes removing each of the at least one of the city and the state.

\* \* \* \* \*